३,५६२,११३
RAPID MICROBIOLOGICAL PRODUCTION OF ALPHA-GALACTOSIDASE
Sin'Itiro Kawamura, Takamatsu, Kagawa-ken, and Tadasi Kasai and Sumizo Tanusi, Mikicho, Kagawa-ken, Japan, assignors to the United States of America as represented by the Secretary of Agriculture
No Drawing. Filed June 17, 1968, Ser. No. 737,343
Int. Cl. C07g 7/028
U.S. Cl. 195—66                                                     1 Claim

ABSTRACT OF THE DISCLOSURE

Purified extracts of sonicated 4–8 hour cultures of *Escherichia coli*, subsp. *communior*, ATCC 7009; provide very high yields of α-galactosidase that hydrolyzes raffinose and other α-galactosides.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

It is well known in the beet sugar industry that raffinose seriously depresses the crystallization of sucrose from the beets, and that much higher yields would be expected if the galactoside were to be enzymatically hydrolyzed or otherwise eliminated, see Suzuki et al., Agr. Biol. Chem. 30: 1039 (1966). Likewise, it is known that soybeans contain about 5 percent total of several galactosidic oligosaccharides, i.e., 4 percent stachyose, 1 percent raffinose, and a trace of verbascose, and that the almost universal absence of alimentary α-galactosidase (also called melibiase) not only in humans but also in livestock and other domestic animals makes these soybean galactosidic oligosaccharides and their hydrolysis products, i.e., mannotriose and melibiose essentially non-nutritive and thus may actually thereby be the basis for the common problem of flatulence associated in humans with even low levels of soybean ingestion, which problem may well limit the effectiveness of our expanding aid-to-underprivileged-countries program which is now donating large amounts of the newly developed CSM powder (corn-meal-soy-nonfat milk solids) for formulation with water into gruels and milk substitutes especially for infants and children. Thus, an inexpensive supply of high titer α-galactosidase for pretreating soybean foodstuffs and livestock feeds could improve the food value of soybeans. Also, nutritional and carbohydrate research would be benefited by a low cost source of potent, highly purified α-galactosidase free of sucrase and other enzymes.

Although α-galactosidase has been obtained from coffee beans and Plantago seeds and α-galactosidase activity is known to be exhibited by a variety of microorganisms including brewers' yeast, certain Aspergilli, several strains each of Streptococcus and Streptomyces, and also to some extent by *Escherichia coli* (see Schmitt et al., Biochem. Biophys. Res. Comm. 22: 473 (1966)), no microorganisms capable of producing large amounts of α-galactosidase in just a few hours have been taught prior to our invention.

The principal object of our invention is the provision of a 4–8 hour microbiological process for very rapidly generating large amounts of α-galactosidase, i.e., in only 4–8 hours of fermentation. A more specific object is the provision of a process comprising the aerobic fermentation in an inexpensive aqueous medium, the following specific and uniquely active strain of *E. coli*, namely, *Escherichia coli*, subsp. *communior*, unrestrictedly available since 1956 as ATCC 7009 (also long deposited as IAM 1272) which exclusive strain we have unexpectedly discovered immediately begins to form very large amounts of overwhelmingly intracellular α-galactosidase and achieves a maximum of over 400 units per ml. in only about 4 hours of fermentation whereas none of the 18 other *E. coli* members that we studied, including two other deposits of *E. coli communior*, began to form more than traces of the enzyme until after 2–3 days, and even then the best of these other strains by respectively 120 hours and 144 hours of fermentation produced lower yields of α-galactosidase than that so rapidly produced by *E. coli* subsp. *communior* ATCC 7009 of our invention.

An associated object of the invention is the provision of a highly preferential purification process whereby the α-galactosidase present in the centrifuged supernatant after disruption of the *E. coli* cells by sonication or other physical means is increased about 142-fold whereas the concentration of other cytoplasmic proteins liberated from the destroyed cells is greatly lowered, thus providing a substantially pure α-galactosidase concentrate free of sucrase.

In accordance with the above general objects and guided initially by chromatographic evidence of the extents to which inocula of the many different strains of *E. coli* lowered the 0.5 percent raffinose content of a 1 percent meat extract/1 percent peptone/0.5 percent NaCl boullion and the melibiose content of a Sörenson phosphate buffer screening medium containing 0.5 percent melibiose when incubated therein for 24 hours at 37° C., and then with absolute precision, spectrophotometrically determining at 400 mµ the extents to which 20-minute incubations of cell-free extracts with p-nitrophenyl-α-D-galactoside substrate released the p-nitrophenyl moiety, we have discovered that 4–8 hour shake fermentations of 3 percent by volume inoculations of a 10–20 hour culture of *E. coli*, subsp. *communior*, ATCC 7009 in the following well water semisynthetic medium

|   | Percent |
|---|---|
| $(NH_4)_2SO_4$ | 0.2 |
| $K_2HPO_4$ | 0.7 |
| $KH_2PO_4$ | 0.3 |
| Peptone | 0.5 |
| $MgSO_4 \cdot 7H_2O$ | 0.02 |
| Raffinose | 0.25 | begins within minutes to form very rapidly increasing amounts of almost exclusively intracellular α-galactosidase whereby a combined activity level of roughly 1200 units per 50 ml. at 1 hour increases by the end of 4 hours to a maximum of about 22,250 units per 50 ml., almost all of which, i.e., 98% or 21,750 units are intracellular and are released into the medium upon ultrasonic disruption of the *E. coli* cells.

Customary concentration techniques proved inoperative. For example, attempts to salt out the liberated enzyme with sodium chloride or with sulfates of magnesium or ammonium inactivated about 60 percent of the enzyme; precipitation at low temperature with ethanol was ineffective, as was column chromatography on carboxymethyl cellulose or on "Sephadex." However, a final 142-fold increase in activity was achieved by the purification steps detailed in the following complete description of a specific embodiment according to our invention.

EXAMPLE 1

Each of a series of eight 500 ml. sterilized long-necked Sakaguchi flasks very closely resembling Florence flasks and containing 125 ml. of the following semisynthetic aqueous fermentation medium expressed in percentages by weight of the total medium warmed to 37° C.

| | |
|---|---|
| Ammonium sulfate | 0.2 |
| Dipotassium phosphate | 0.7 |
| Potassium dihydrogen phosphate | 0.3 |
| Peptone | 0.5 |
| Magnesium sulfate | 0.02 |
| Raffinose | 0.25 |

Well water (trace metal salts).

was inoculated with 3.7 ml. (3%) of a 20-hour subculture of E. coli subsp. *communior* ATCC 7009. After plugging the inoculated flasks, they were incubated for 4 hours at 37° C. on a horizontal shaker reciprocating at the rate of 120 strokes per minute. Then the fermented medium was quickly cooled to 0–5° C. and the E. coli cells then isolated by 15 minutes of sedimentation in a refrigerated 8000 r.p.m. centrifuge. The sedimented cells were washed with 0.1 part distilled water, pooled, suspended in about 0.02 part of 20 mM. phosphate buffer (pH 6.8) in which they were then subjected to sonication at 20 kc. for 15 minutes. After bringing the volume to 0.05 of the original with 20 mM. phosphate, the cellular debris were removed by centrifugation giving ca. 50 ml. of supernatant having a total α-galactosidase activity of 434,800 units (8696 m$\mu$ M/min./ml.), a protein content of 42.2 mg. per milliliter, and a specific activity value per m$\mu$ M/mg. protein of 192.6. Since α-galactosidase per se is not adsorbed on CPG (calcium phosphate gel), we added 2 times the protein weight of CPG to the impure enzyme solution and centrifuged off the gel and adsorbed protein. The CPG treatment was repeated twice whereby the protein content of the enzyme material was lowered to 9.9 mg./ml. while the specific activity, m$\mu$ M/mg. protein, increased to a value of 645, i.e., a 3.7-fold increase.

To simultaneously salt-out the enzyme and to lower the phosphate buffer concentration from 20 mM. to 5 mM., 14 grams of $Na_2SO_4$ was added to the 50 ml. of enzyme solution and was dissolved with slight warming (35° C.). The pH was adjusted to 6.8 with 0.1 N NaOH, and the centrifuged precipitate was then dialyzed for 24 hours at 2–5° C. against 1000 ml. 5 mM. phosphate buffer to remove the sulfate. The dialysate containing the α-galactosidase was restored to 50 ml. by addition of 5 mM. phosphate buffer.

Whereas α-galactosidase is adsorbed on CPG at phosphate buffer concentrations of 5 mM. or less and is eluted from CPG in the presence of 20 mM. or greater concentrations of the buffer, we added 3 times as much by weight of the CPG as the total weight of protein in the solution, allowed 30 minutes for adsorption of the enzyme on the CPG, collected the centrifuged precipitate, eluted the enzyme with 8 ml. 20 mM. buffer and recentrifuged to obtain the supernatant, repeating 4 times to completely elute the enzyme. The pooled eluates were brought to a volume of 30 ml. by addition of buffer. The extract having a protein content of only 0.601 mg./ml. assayed a α-galactosidase activity of 6475 m$\mu$ M/min./ml. and a specific activity of 10,610 m$\mu$ M/m. protein.

Optionally, the above was further purified to an activity titer of 17,653 m$\mu$ M/min./ml. and specific activity value of 27,350 m$\mu$ M/mg. protein at an only slightly increased protein content of (essentially pure α-galactosidase) of 0.646 mg./ml. in a volume of only 8 ml. by resalting out the 30 ml. of treated solution with 6.6 g. of $Na_2SO_4$, redialyzing, treating with 0.1 as much CPG as previously used, and eluting 4 times with 2 ml. with 20 mM. phosphate buffer. The enzyme solution is free of β-galactosidase and of sucrase.

We claim:

1. A process for rapidly producing large amounts of α-galactosidase and then obtaining the same in greatly purified form, said process comprising:
   (a) inoculating a culture medium having the following percentage composition:

| | |
   |---|---|
   | Ammonium sulfate | 0.2 |
   | Dipotassium phosphate | 0.7 |
   | Potassium acid phosphate | 0.3 |
   | Peptone | 0.5 |
   | Magnesium sulfate heptahydrate | 0.02 |
   | Raffinose | 0.25 |
   | Hard water q.s. a.d. | 100.00 | with about 3 percent based on the weight of the broth of a viable 20 hour subculture of E. coli subsp. *communior* ATCC 7009;
   (b) fermenting the inoculated medium at 37° C. for about 4–8 hours on a reciprocating shaker;
   (c) cooling the fermented medium to just above the freezing point to terminate the fermentation and preserve the α-galactosidase;
   (d) isolating the E. coli cells;
   (e) subjecting a 20 mM. phosphate buffer suspension of the washed cells to sufficient sonication to thoroughly disrupt the cells and release the intracellularly-contained α-galactosidase thereto;
   (f) centrifuging off the cellular debris;
   (g) and essentially freeing the α-galactosidase solution of other enzymes and proteins released by the disruption of E. coli cells by subjecting the centrifuged 20 mM. phosphate buffer solution containing the impure α-galactosidase at least once to the following series of treatment:
   adsorption and removal of protein impurities on calcium phosphate gel
   adding $Na_2SO_4$ to salt out α-galactosidase
   dialysing against 5 mM. phosphate buffer
   adsorbing α-galactosidase on calcium phosphate gel
   eluting the α-galactosidase from gel with 20 mM. phosphate buffer.

References Cited

Suzuki et al., Agricultural and Biological Chemistry, vol. 30, pp. 1039–1046 (1966).

Schmitt et al., Biochem. Biophys. Res. Comm., vol 22, pp. 473–479 (1966).

LIONEL M. SHAPIRO, Primary Examiner